United States Patent [19]

Waegerle

[11] 4,303,546
[45] Dec. 1, 1981

[54] PROCESS OF TREATING AQUEOUS HEATING MEDIA IN HEATING SYSTEMS, AND COMPOSITION

[75] Inventor: Rolf R. Waegerle, Ladenburg, Fed. Rep. of Germany

[73] Assignee: Benckiser-Knapsack GmbH, Ludwigshafen am Rhein, Fed. Rep. of Germany

[21] Appl. No.: 492,249

[22] Filed: Jul. 26, 1974

Related U.S. Application Data

[63] Continuation of Ser. No. 25,562, Apr. 3, 1970, abandoned.

[30] Foreign Application Priority Data

Apr. 5, 1969 [DE] Fed. Rep. of Germany ....... 1917686

[51] Int. Cl.$^3$ .......................... C02F 5/10; C02F 5/12; C02F 5/14
[52] U.S. Cl. ......................... 252/180; 252/DIG. 11; 422/15; 422/16; 422/17
[58] Field of Search ................... 252/180, 181, 80, 82, 252/146, 148, 388, 394, 390, 396, 175, DIG. 11; 21/2.7, 57, 58; 134/3, 2, 41; 210/58, 59; 422/15, 16, 17

[56] References Cited

U.S. PATENT DOCUMENTS

| | | | |
|---|---|---|---|
| 3,308,062 | 3/1967 | Gunther | 252/180 |
| 3,317,340 | 5/1967 | Ziehr | 134/3 |
| 3,336,221 | 8/1967 | Ralston | 252/180 |
| 3,393,150 | 7/1968 | Ralston | 252/180 |
| 3,434,969 | 3/1969 | Ralston | 252/180 |
| 3,445,179 | 5/1969 | Jansen | 21/2.7 |
| 3,451,939 | 6/1969 | Ralston | 252/181 |
| 3,639,645 | 2/1972 | Miller et al. | 252/180 |

*Primary Examiner*—Deborah L. Kyle
*Attorney, Agent, or Firm*—Schwartz, Jeffery, Schwaab, Mack, Blumenthal & Koch

[57] ABSTRACT

Scale formation as well as corrosion are suppressed by adding amino methylene phosphonic acids, hydroxy alkane diphosphonic acids, amino alkane diphosphonic acids, polyhydroxy acids, their alkali metal salts, or mixtures thereof to the aqueous heating medium of heating systems used for heat treating, such as sterilizing and pasteurizing, goods enclosed in glass, metal, and the like containers.

18 Claims, No Drawings

PROCESS OF TREATING AQUEOUS HEATING MEDIA IN HEATING SYSTEMS, AND COMPOSITION

This is a continuation, of application Ser. No. 25,562 filed Apr. 3, 1970 now abandoned.

BACKGROUND OF THE INVENTION

1. Field of the Invention

The present invention relates to a novel and advantageous process of treating heating apparatus using hot water or steam as source of heat such as water and steam baths and especially to a process of treating such apparatus serving for pasteurizing and/or sterilizing victuals or medicines which are packed and watertightly sealed in glass, plastic, or metal containers.

2. Description of the Prior Art

It is frequently necessary to subject packed goods to a thermal treatment in a water or steam bath. Containers such as metal cans, plastic containers, preserve jars, and the like are, for instance, pasteurized and/or sterilized by heating them to a more or less increased temperature.

Such a thermal treatment in aqueous heating media can be carried out in open containers at atmospheric pressure or in enclosed systems under pressure to effect heating above the boiling point of water or in systems kept under vacuum for a gentle thermal treatment. In many cases the temperatures to which the goods in their containers are heated exceed 100° C. Such a thermal treatment is required, for instance, in the production of sterilized milk and of condensed milk, of canned meat and fish, of preserves of vegetable and fruits, of dietetic food, of medicinal preparations and the like. Thereby, disagreeable side-effects such as corrosion of the containers and of those parts of the apparatus used for the thermal treatment, which are in contact with the aqueous heating medium, i.e. with steam or hot water, are encountered. Furthermore, deposits of the hardness causing salts in the water may be formed on such thermal treatment. These deposits caused by the specific composition and properties of the water used for the thermal treatment, cover the container walls as well as the packing enclosing the sterilized or pasteurized goods. In addition thereto the apparatus used for the thermal treatment are contaminated very frequently by the goods to be heat-treated either due to careless handling of the containers or to their becoming leaky or to breakage of the containers.

It is known to clean cans inserted into an autoclave, by means of a special cleaning agent as this is described, for instance, in "Der Fisch" vol. 3, page 544 (1949). It is also disclosed in German Pat. No. 617,585 to clean the empty heating apparatus by enzymatically removing milk residues. German Pat. No. 694,237 suggests to remove beer and milk scale, for instance, from pasteurizing apparatus by the addition of rather large amounts of a cleaning composition composed of tartaric acid together with smaller amounts of other salts as well as of phosphoric acid. Such scale removing compositions have an acid pH-value and thus are quite corrosive. The cleaning composition is added to remove beer, milk, and other chalk-containing scaly deposits after they have formed in the apparatus.

All these known processes, however, have the disadvantage that they do not prevent corrosion of the apparatus and the containers. Such corrosions are always encountered when using water for the thermal treatment which has a high oxygen content free carbon dioxide or, respectively, has a high content of chlorides, sulfates, and nitrates.

Heretofore, sterilizer autoclaves of different types of construction have been used for the thermal treatment of packed goods. To avoid corrosion, such sterilizer autoclaves have been equipped with anodes to be sacrificed. Another method of avoiding corrosion was the addition of sodium silicates, nitrites, chromates, sulfites, or specific types of mineral oils. However, the results achieved by the installment of such anodes or the addition of anticorrosive agents were rather unsatisfactory. Furthermore, it is evidently not appropriate to use nitrites or chromates when treating containers for victuals.

It is known from the art of water conditioning to prevent formation of calcareous fur or incrustations in aqueous systems by the addition of water soluble polyphosphates together with amino methylene phosphonates in substoichio-metric, so called "inoculating" amounts between about 0.5 mg./l. and about 25 mg./l. and as corrosion protecting agent sodium zinc polyphosphates in inoculating amounts between about 1 mg. of $P_2O_5$/l. and about 10 mg. of $P_2O_5$/l. These additives are added, however, to running water which is exposed, at the most, to a temperature up to 80° C.

SUMMARY OF THE INVENTION

It is one object of the present invention to provide a simple and highly effective process of treating heating systems using hot water or steam as source of heat used for the heat treatment of goods enclosed and water tightly sealed in glass, plastic, or metal containers, and especially for pasteurizing and/or sterilizing victuals or medicines whereby scale formation at and corrosion of the walls of the heating apparatus and systems as well as the containers for the goods are prevented.

Another object of the present invention is to provide compositions to be added to such heating systems using hot water or steam as source of heat in order to prevent or suppress corrosion of and scale deposition at the walls of the heating apparatus and systems as well as the containers for the goods to be subjected to heat treatment.

Other objects of the present invention and advantageous features thereof will become apparent as the description proceeds.

In principle the process of treating aqueous heating systems and apparatus using hot water or steam as source of heat, such as water or steam baths as they are employed for the heat treatment of goods enclosed and water tightly sealed in glass, plastic, or metal containers comprises the addition of amino methylene phosphonic acids, hydroxy alkane diphosphonic acids, hydroxy acids with at least two vicinal hydroxyl groups, or the alkali metal salts of such acids, or mixtures thereof to such aqueous heating systems.

Suitable phosphonic acids or polyhydroxy acids are, for instance, amino methylene phosphonic acids of the following formulas.

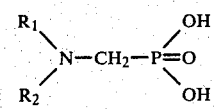

Formula I:

wherein
R$_1$ is the group of the formula

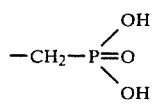

and
R$_2$ is the group of the formula

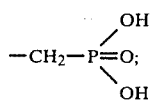

or the group of the formula

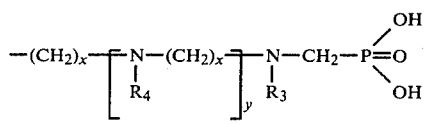

wherein
R$_3$ and R$_4$ are hydrogen or the group of the formula

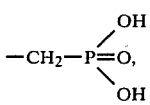

x is an integer from 2 to 3, and
y is an integer from 0 to 4; or the group of the formula

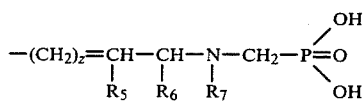

wherein
R$_5$ is hydrogen;
R$_6$ is alkyl, preferably lower alkyl, and R$_5$ and R$_6$ together form alkylene,
R$_7$ is hydrogen or the group of the formula

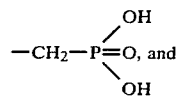

z is an integer from 0 to 1.

Amino methylene phosphonic acids which are especially useful in the process of treating aqueous heating systems according to the present invention are, for instance, the following acids:

Amino tris-(methylene phosphonic acid),
diethylene triamino penta-(methylene phosphonic acid),
propylene diamino tetra-(methylene phosphonic acid),
ethylene diamino tetra-(methylene phosphonic acid), and others.
1,2-Cyclohexane diamino tetra-(methylene phosphonic acid), and 1-amino methyl cyclopentylamino-(2)-tetra-(methylene phosphonic acid),
and the like compounds have also been found of value.

Hydroxy or amino alkane diphosphonic acids of the following Formula II have also proved to be useful in the process according to the present invention.

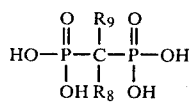

Formula II:

wherein
R$_8$ is hydroxyl or an amino group, while
R$_9$ is alkyl with 1 to 8 carbon atoms when R$_8$ is hydroxyl; or aryl, preferably phenyl, cycloalkyl, preferably cyclohexyl or cyclopentyl, or alkyl with 1 to 10 carbon atoms when R$_8$ is an amino group.
Such compounds are, for instance,
1-Hydroxy ethane-1,1-diphosphonic acid, and others.
Aliphatic polyhydroxy carboxylic acids with two vicinal hydroxyl groups such as
gluconic acid,
tartaric acid,
citric acid
and the like polyhydroxy carboxylic acids are especially useful for the purpose of the present invention.

Furthermore, pentoses and hexoses or polyvalent alcohols such as glycerol or sorbitol may be added to the aqueous systems to be treated according to the present invention in addition to the amino methylene phosphonic acids, hydroxy or amino alkane diphosphonic acids, polyhydroxy carboxylic acids, or other alkali metal salts.

It is, of course, understood that the amount of scale formation and corrosion preventing additive according to the present invention which is added to the aqueous system depends upon the quality of the water employed therein. Its content of hardness causing constituents is of special importance. As an average, addition to 100 l. of water of amounts between about 0.05 g. and about 150 g. of the additive are usually sufficient to produce the desired scale formation and corrosion preventing or suppressing effect.

Combinations of the phosphonic acids with the polyhydroxy acids have proved to be of special value because their anticorrosive effect is superior to that of the two compounds when used alone. Thus the combinations exhibit a pronounced synergistic effect.

A mixture of diethylene triamino pentamethylene phosphonic acid and gluconic acid or sodium gluconate in the proportion of 1:1 has proved to be especially suitable for the purpose of the present invention. Such a mixture is added to the water in an amount between about 0.1 g./100 l. and about 100 g./100 l. and preferably in an amount between about 5 g./100 l. and about 40 g./100 l.

The addition of the above mentioned phosphonic acids and/or hydroxy acids results in the elimination of the hardness causing salts in the water used for heat treatment, in preventing or suppressing corrosion, in providing the metal parts of the apparatus with a protective coating, in removing scale or fur and calcareous incrustations when already formed in the apparatus, and in preventing formation of scale and incrustations on the containers for the goods to be sterilized or otherwise heat treated. Thus fully satisfactory appearance of the packing containers is achieved. The containers keep their perfect and pleasing appearance over a prolonged period of time.

DESCRIPTION OF THE PREFERRED EMBODIMENTS

The following examples serve to illustrate the present invention without, however, limiting the same thereto.

EXAMPLE 1

The following tests were carried out in upright autoclaves of a capacity of 10 l. of water. The autoclaves were operated at about 4 atm. gauge and at 140° C. They were charged with conventional tin plate cans.

Tap water of the following composition was used for sterilization:

| | |
|---|---|
| Total hardness | 17.3° (German degrees of hardness) |
| Hardness due to carbonates | 17.3° (German degrees of hardness) |
| pH-value | 7.2 |
| Chlorides | 164.2 mg./l. |
| Sulfates | 36.0 mg./l. |

(a) Autoclave No. 1 was charged with tap water of the above given composition without additive. On sterilizing the cans at 140° C. for 45 minutes, scale formation on the cans and in the autoclave was observed.

(b) Tap water of the above given composition was filled in autoclave No. 2. 5 cc. of a mixture of a 50% aqueous solution of diethylene triamino penta-(methylene phosphonic acid) and a 16% aqueous solution of gluconic acid in the proportion of 1:3, corresponding to 625 mg. of the phosphonic acid and 600 mg. of gluconic acid in 10 l. of tap water, were added. The cans were sterilized at 140° C. for 45 minutes.

(c) Tap water of the following composition was filled in the autoclave No. 3:

| | |
|---|---|
| Total hardness | 29.2° (German degrees of hardness) |
| Hardness due to carbonates | 17.3° (German degrees of hardness) |
| pH-value | 7.1 |
| Chlorides | 164.2 mg./l. |
| Sulfates | 36.0 mg./l. |

5 cc. of a mixture of a 50% aqueous solution of diethylene triamino penta-(methylene phosphonic acid) and a 16% aqueous solution of gluconic acid in the proportion of 1:1 were added to the water. The amounts of phosphonic acid and gluconic acid added to 10 l. of water thus were, respectively, 1250 mg. and 400 mg.

The autoclaves No. 2 and No. 3 did not show any scale formation and the sterilized cans were free of incrustations and were glossy and shiny.

EXAMPLE 2

The autoclaves No. 1 and No. 2 of Example 1 were used in the following tests. They were charged with tin plate cans containing vegetables. Tap water of the following composition was employed for sterilization:

| | |
|---|---|
| Total hardness | 24.4° (German degrees of hardness) |
| Hardness due to carbonates | 12.2° (German degrees of hardness) |
| Chlorides | 170.5 mg./l. |
| Sulfates | 60.6 mg./l. | i.e. a relatively hard water of highly corrosive properties under the sterilizing conditions. Sterilization was carried out at a temperature of 112° C. and a pressure of about 1.5 atm. gauge for about 45 minutes.

(a) The water in autoclave No. 1 did not contain any additive.

(b) 2.5 cc. of a 50% aqueous diethylene triamino pentamethylene phosphonic acid solution corresponding to 1250 mg. per 10 liters of water were added thereto.

(c) Sterilization was effected in autoclave No. 3 under the same conditions and with the same addition of diethylene triamino pentamethylene phosphonic acid but by using tap water of the following composition:

| | |
|---|---|
| Total hardness | 10.5° (German degrees of hardness) |
| Hardness due to carbonates | 8.6° (German degrees of hardness) |
| Chlorides | 15.2 mg./l. |
| Sulfates | 18.0 mg./l. |

In contrast to test (a) with tap water but without additive the water in tests (b) and (c) which was treated with diethylene triamino pentamethylene phosphonic acid did not show any scale formation in the autoclaves nor any incrustations on the cans. The surfaces of the cans were bright and shiny and were not corroded.

EXAMPLE 3

The tests were carried out in two upright autoclaves No. 1 and No. 2 each containing 10 l. of water. Sterilization was effected by heating at 140° C. and a pressure of about 4 atm. gauge for 120 minutes. Both autoclaves were charged with conventional tin plate cans. The water used for sterilization was tap water of the following composition:

| | |
|---|---|
| Total hardness | 17.3° (German degrees of hardness) |
| Hardness due to carbonates | 17.3° (German degrees of hardness) |
| Chlorides | 14.2 mg./l. |
| Sulfates | 31.0 mg./l. |

66 cc. of a 16% aqueous solution of gluconic acid corresponding to 9.6 g. per 1.0 l. of water were added to autoclave No. 2.

While considerable scale formation was observed in autoclave No. 1 as well as on the cans with the untreated water, no such scale was formed with the treated water in autoclave No. 2 and on the cans sterilized therein.

When adding, in place of the 16% gluconic acid solution, 4 cc. of a mixture of a 50% aqueous solution of diethylene triamino pentamethylene phosphonic acid and a 14% aqueous solution of sodium gluconate in the proportion of 1:1 to the tap water of the above given composition, i.e. 1000 mg. of the phosphonic acid and 280 mg. of sodium gluconate to 10 l. of tap water and operating under otherwise the same conditions, the autoclave as well as the cans were free of incrustations.

The cans had a fully satisfactory, bright, and shiny appearance.

It is, of course, possible to vary the proportions of the phosphonic acids and the gluconic acid or, respectively, its sodium salt in the mixtures added to the water. Especially effective have proved proportions of phosphonic acid to gluconic acid, or respectively, gluconate, between 3:1 and 1:3.

EXAMPLE 4

The autoclaves No. 1 and No. 2 of Example 1 were used in this test. They were charged with vegetable canned in tin plate cans. The water used for sterilization was of the following composition:

| Total hardness | 17.3° (German degrees of hardness) |
|---|---|
| Hardness due to carbonates | 17.3° (German degrees of hardness) |
| Chlorides | 15.2 mg./l. |

5 cc. of a 50% aqueous soluton of nitrilo tris(methylene phosphonic acid) corresponding to 2.5 g. of the phosphonic acid for 10 l. of water were added to the water of autoclave No. 2. Sterilization was effected by heating at 135° C. under a pressure of 1.4 atm gauge for 60 minutes. The cans sterilized in autoclave No. 2 with the treated water did not show any scale formation and incrustation on the cans and in the autoclave in contrast to the cans sterilized in autoclave No. 1 filled with untreated water.

EXAMPLE 5

The tests were carried out in upright autoclaves No. 1 and No. 2, each containing 10 l. of water. They were charged with conventional tin plate cans and sterilized by heating to 130° C. under a pressure of about 1.4 atm. gauge for 90 minutes. The water used in these tests was of the following composition:

| Total hardness | 17.3° (German degrees of hardness) |
|---|---|
| Hardness due to carbonates | 17.3° (German degrees of hardness) |
| Chlorides | 14.0 mg./l. |

5 cc. of a 50% aqueous solution of 1-hydroxy ethane-1,1-diphosphonic acid corresponding to 2.5 g. of the phosphonic acid for 10 l. of water were added to the water in autoclave No. 2. It was found that no scale was formed in the autoclave and on the cans sterilized in the treated water while considerable scale formation was observed when sterilization was effected in untreated water.

EXAMPLE 6

The tests were carried out in upright autoclaves No. 1 and No. 2, each containing 10 l. of water. They were charged with conventional tin plate cans and sterilized by heating to 130° C. under a pressure of about 1.4 atm. gauge for 90 minutes. The water used in these tests was of the following composition:

| Total hardness | 35.0° (German degrees of hardness) |
|---|---|
| Hardness due to carbonates | 28.0° (German degrees of hardness) |
| Chlorides | 150 mg./l. |
| Sulfates | 80 mg./l. |
| Nitrates | 30 mg./l. |
| pH-value | 7.1 |

10 cc. of a mixture of a 50% aqueous solution of diethylene triamino penta-(methylene phosphonic acid) and a 16% aqueous solution of sodium gluconate in the proportion of 1:1 were added to the water in autoclave 2. The amounts of phosphonic acid and sodium gluconate added to 10 l. of water thus were, respectively, 2500 mg. and 800 mg.

In contrast to autoclave 1 and the cans sterilized therein, no scale formation was observed in autoclave 2 and on the cans sterilized therein.

In place of the phosphonic acids and polyhydroxy carboxylic acids used in the preceding examples, there are employed other phosphonic acids and polyhydroxy carboxylic acids and, if desired, other additives in the amounts given in the following examples, while otherwise the procedure as described hereinabove is followed:

| Example No. | Phosphonic acid | Amount added per 100 l. | Polyhydroxy carboxylic acid | Amount added per 100 l. | Proportion of phosphonic acid to poly- hydroxy carboxylic acid | Other additives |
|---|---|---|---|---|---|---|
| 7 | Propylene diamino tetra-(methylene phosphonic acid) | 25 g. | Tartaric acid | 75 g. | 1 : 3 | — |
| 8 | 1,2-Cyclohexane diamino tetramethylene phosphonic acid | 3 g. | Citric acid | 3 g. | 1 : 1 | — |
| 9 | Ethylene diamino tetra-(methylene phosphonic acid) | 40 g. | — | — | — | — |
| 10 | 1-Aminomethyl cyclo-pentylamino-(2)-tetra-(methylene phosphonic acid) | 70 g. | — | — | — | — |

I claim:
1. A process for treating an aqueous medium in a heating system used for the heat treatment of containers, comprising the step of adding to the aqueous heating medium in said heating system a scale- and corrosion-suppressing composition comprising:
   (a) A phosphonic acid compound selected from the group consisting of diethylene triamino penta-(methylene phosphonic acid), nitrilo tris-(methylene phosphonic acid), propylene diamino tetra-(methylene phosphonic acid), ethylene diamino tetra-(methylene phosphonic acid), and alkali metal salts thereof, and (b) a polyhydroxy acid component selected from the group consisting of gluconic acid and its salts, the proportion of phosphonic acid compound to polyhydroxy acid compound in said composition being between about 3:1 and about 1:3, and the amounts of scale- and corrosion-suppressing composition added to the heating system being between about 0.1 g. and about 100 g. for 100 liters of aqueous heating medium.

2. The process of claim 1, wherein the scale-and corrosion-suppressing composition comprises a mixture of diethylene triamino penta-(methylene phosphonic acid) and gluconic acid.

3. The process of claim 1, wherein the scale-and corrosion-suppressing composition comprises a mixture of diethylene triamino penta-(methylene phosphonic acid) and sodium gluconate.

4. The process of claim 3, wherein the scale-and corrosion-suppressing composition is added in an amount of about 11 grams per 100 liters of aqueous heating medium.

5. The process of claim 1, wherein the polyhydroxy acid component is gluconic acid.

6. The process of claim 1, wherein the phosphonic acid compound is nitrilo tris-(methylene phosphonic acid).

7. The process of claim 1, wherein the amount of said scale-and corrosion-suppressing composition added is between about 5 and 40 grams/100 liters of aqueous heating medium.

8. The process of claim 1, wherein the ratio of phosphonic acid component and polyhydroxy acid component is about 1:1.

9. A process for treating an aqueous medium in a heating system used for the heat treatment of containers, comprising the step of adding to the aqueous heating medium in said heating system a scale- and corrosion suppresing composition comprising:

(a) an alkaline diphosphonic acid of the formula

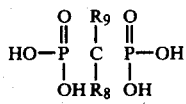

wherein $R_8$ is a member from the group consisting of hydroxy and an amino group, and $R_9$ is a member selected from the group consisting of alkyl with 1 to 8 carbon atoms when $R_8$ is hydroxyl, and from the group consisting of aryl, cycloalkyl, and alkyl with 1 to 10 carbon atoms when $R_8$ is an amino group; and (b) a polyhydroxy acid component selected from the group consisting of gluconic acid and its salts, the proportion of phosphonic acid compound to polyhydroxy acid compound in said composition being between about 3:1 and about 1:3, and the amounts of scale- and corrosion-suppressing composition added to the heating system being between about 0.1 g. and about 100 g. for 100 liters of aqueous heating medium.

10. The process of claim 9, wherein the phosphonic acid compound is 1-hydroxy ethane-1,1-diphosphonic acid.

11. Aqueous heating system useful for the treatment of goods packed and water-tightly sealed in glass, metal, and the like containers, said system comprising an aqueous heating medium having dissolved in 100 liters of said aqueous medium between about 0.1 g. and about 100 g. of a scale- and corrosion-suppressing composition comprising a mixture of (a) a phosphonic acid compound selected from the group consisting of diethylene triamno penta-(methylene phosphonic acid), nitrilo tris-(methylene phosphonic acid), propylene diamino tetra-(methylene phosphonic acid), ethylene diamino tetra-(methylene phosphonic acid, and alkali metal salts thereof, (b) a polyhydroxy acid compound selected from the group consisting of gluconic acid and its salts, the proportion of phosphonic acid compound to polyhydroxy acid compound in said aqueous heating medium being between about 3:1 and about 1:3.

12. The aqueous heating system of claim 11, in which the amount of the scale-and corrosion-suppressing composition dissolved in 100 liters of said aqueous medium is between about 5 g. and about 40 g.

13. The aqueous heating system of claim 11, in which the scale-and corrosion-suppressing composition dissolved in said aqueous medium comprises a mixture of (a) diethylene triamino penta(methylene phosphonic acid) and (b) gluconic acid.

14. The aqueous heating system of claim 11, in which the scale-and corrosion-suppressing composition dissolved in said aqueous medium comprises a mixture of (a) diethylene triamino penta-(methylene phosphonic acid) and (b) sodium gluconate.

15. The aqueous heating system of claim 11, wherein the phosphonic acid is diethylene triamino penta-(methylene phosphonic acid).

16. The aqueous heating system of claim 11, wherein the phosphonic acid compound is nitrilo tris-(methylene phosphonic acid).

17. The aqueous heating system of claim 11, wherein the phosphonic acid compound is ethylene diamino tetra-(methylene phosphonic acid) or an alkali metal salt thereof.

18. A process for heat-treating containers, comprising the step of exposing said containers at a temperature exceeding 100° C. and for a period of time between about 45 and 120 minutes to an aqueous heating system comprising a mixture of (a) a phosphonic acid compound selected from the group consisting of diethylene triamino penta-(methylene phosphonic acid), nitrilo tris-(methylene phosphonic acid), propylene diamino tetra-(methylene phosphonic acid), ethylene diamino tetra-(methylene phosphonic acid), and the alkali metal salts of said acids, and (b) a polyhydroxy acid compound selected from the group consisting of gluconic acid and its salts, the proportion of phosphonic acid compound to polyhydroxy acid compound in said aqueous heating medium being between about 3:1 and about 1:3.

* * * * *